Feb. 16, 1954

H. ERICKSON 2,669,218

AUTOMATIC POULTRY FEEDER

Filed Nov. 27, 1950

Harry Erickson
INVENTOR.

Feb. 16, 1954   H. ERICKSON   2,669,218
AUTOMATIC POULTRY FEEDER
Filed Nov. 27, 1950   2 Sheets-Sheet 2

Harry Erickson
INVENTOR.

Patented Feb. 16, 1954

2,669,218

UNITED STATES PATENT OFFICE 2,669,218

AUTOMATIC POULTRY FEEDER

Harry Erickson, Raymond, Nebr.

Application November 27, 1950, Serial No. 197,689

4 Claims. (Cl. 119—57)

This invention comprises novel and useful improvements in feeders, and more particularly pertains to an automatic poultry feeder.

An important object of this invention is to provide a feeder for poultry and the like which will maintain a predetermined amount of feed in the feed trough.

Another important object of this invention is to provide a poultry feeder which will automatically dispense feed from a hopper into the feed trough as the feed is consumed from the latter.

A further object of this invention is to provide a hopper which is so constructed and positioned that it will prevent the poultry from entering the trough and scratching therein.

Yet another object of this invention is to provide an agitator for the poultry feed hopper which is actuated each time the dispenser is operated, to prevent clogging of the feed in the hopper and permit the dispenser to properly dispense the feed.

An additional object of this invention is to provide an actuator for the dispensing means which will actuate the dispensing means only when a predetermined minimum of feed is disposed in the trough and will deactuate the dispensing means after a predetermined maximum amount of feed has been dispensed into the trough.

An important feature of this invention resides in the provision of a counterbalanced trough with a mechanism for dispensing feed into the trough, and with a mechanism for controlling the dispensing mechanism in response to movement of the trough about its fulcrum, whereby a predetermined amount of feed is maintained in the trough.

Another feature of this invention resides in the provision of a counterbalance for the trough in which the center of gravity thereof will shift as the trough moves about its pivot, whereby the dispenser will be actuated only when a predetermined minimum amount of feed remains in the trough, and deactuated after a predetermined maximum amount of feed has been positioned in the trough.

A further feature of this invention resides in the provision of a hopper disposed above the trough and having relatively converging side walls, with the dispenser disposed in the hopper, the hopper being so constructed and positioned it precludes the poultry from bodily entering the trough.

These, together with various ancillary objects and features are attained by this device, a preferred embodiment of which has been illustrated in the accompanying drawings wherein:

Figure 5 is a reduced perspective elevational view showing one side of the feeder; and, Figure 6 is a reduced perspective elevational view showing the other side of the feeder.

Figure 1:
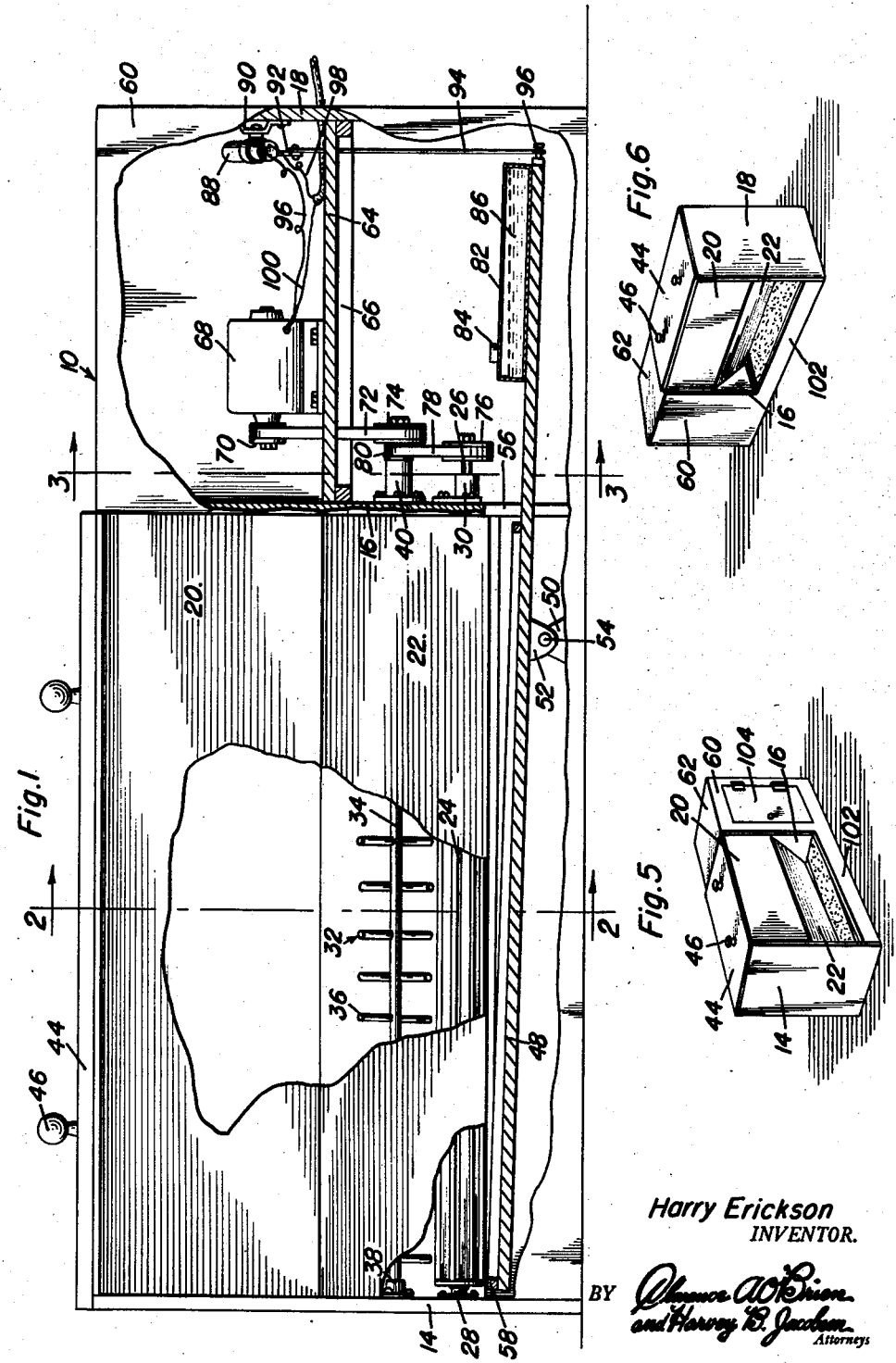
Figure 1 is a side elevational view of the hopper, parts being broken away and shown in section to show details of construction.
Figure 2:
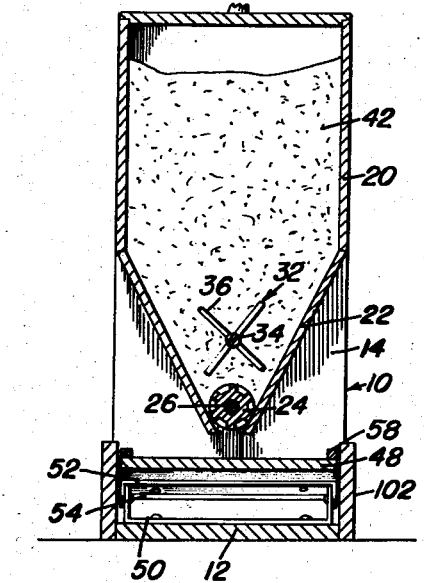
Figure 2 is a transverse sectional view, taken on the plane 2—2 of Figure 1.
Figure 3:
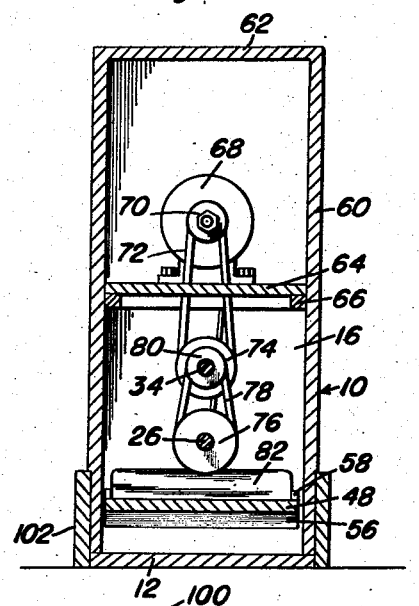
Figure 3 is a transverse sectional view taken on the plane 3—3 of Figure 1.
Figure 4:
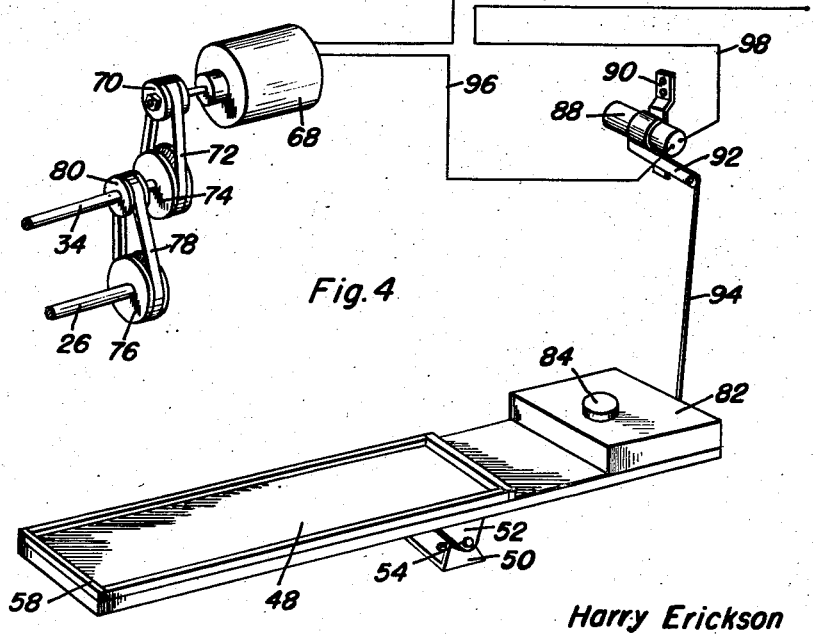
Figure 4 is a diagrammatic sketch showing the dispenser actuating mechanism.

Reference is now made more specifically to the accompanying drawings wherein the feeder is denoted generally by the numeral 10.

The base of the feeder 10 includes a bottom wall 12, and a plurality of longitudinally spaced upstanding panels 14, 16 and 18. The hopper is formed between adjacent panels 14 and 16 and includes a pair of side walls 20 secured to the adjacent panels 14 and 16 which side walls include relatively converging portions 22 forming a dispenser chute.

The dispenser includes a longitudinally fluted cylinder 24 which has a shaft 26 extending therethrough and which shaft has its end rotatably mounted in journals 28 and 30 attached to the adjacent upstanding panels 14 and 16. An agitator 32 which includes a rod 34 and radially extending longitudinally spaced fingers 36 is rotatably mounted in journals 38 and 40, carried by the panels 14 and 16 respectively. The agitator is disposed above the dispenser cylinder 24 in the hopper, to agitate the feed 42 in the hopper to insure that the feed will be properly dispensed. A cover 44, having handles 46 thereon is detachably disposed on the hopper to prevent poultry from entering the latter.

An elongated feed trough 48 is vertically pivotally attached to the bottom wall 12 by means of the trunnions 50 and 52 carried by the bottom wall 12 and trough respectively, the trunnion being connected by a suitable pivot pin 54.

The panel 16 has an opening 56 therein through which the trough 48 movably extends, that portion of the trough which underlies the hopper being provided with a marginal retaining flange 58 to retain the feed thereon.

Side plates 60 are secured to the panels 16 and 18 to provide a housing for the feeder actuating mechanism, a suitable top wall 62 being secured to the plates 60. A shelf 64 is mounted by brackets 66 in the housing in vertical spaced relation to the bottom wall 12, and constitutes a support for an electrical motor 68. The motor pulley 70 is drivingly connected by a belt 72 to the rod pulley 74 and the shaft pulley 76 is connected by a belt 78 to a pulley 80 carried by the rod whereby the agitator and dispenser will be driven in timed relation to each other by the motor.

The trough 48 has a receptacle 82 on the end thereof which is disposed in the housing, which receptacle has a closure member 84 thereon whereby the receptacle may be filled with a liquid 86 for counterbalancing the trough. It is intended the level of the liquid be below the top of the receptacle whereby when the trough is tilted the center of gravity of the fluid 86 will shift towards and away from the pivot pin 54, dependent on whether the receptacle end of the trough is above or below the horizontally disposed neutral position of the trough. A mercury switch 88 is vertically pivotally attached to the panel 18, as by bracket 90 and an operating arm 92 carried by the switch 88 is connected by a link 94 to the pivot pin 96 attached to the trough 48.

As will be noted, the switch 88 is connected in series with the motor 68 and a source of power (not shown) by conductors 96 and 98, the motor being otherwise connected by conductor 100 to the source.

A pair of side rails 102 are attached to the bottom wall 12 on opposite sides of the trough to prevent poultry from stepping on the same. Further, one of the side plates 60 may be provided with a hinged door 104 to facilitate access to the feeder actuating mechanisms previously described.

In operation, whenever less than a predetermined minimum amount of feed is disposed on the trough, the trough will pivot about the pin 54 into the position shown in Figure 1, due to the counterbalance receptacle and fluid 82 and 86 respectively. The switch 88 will then be moved to its circuit closing position by the link 94 which will cause the agitator and dispenser to be operated thereby depositing feed on the trough. Since a longitudinally fluted cylinder is utilized as the dispenser, it will be apparent that it may be so designed as to contact the relatively converging portions 22 of the side walls whereby only measured quantities, determined by the size of the flutes in the cylinder will be dispensed.

Since the center of gravity of the fluid 86 moves away from the pivot pin 54 when the latter is in its switch actuating position, it will be noted that the dispenser will continue to operate until a quantity of feed is deposited on the trough sufficient to cause the trough to move back into its neutral position. Since, as previously discussed, the center of gravity of the fluid shifts as the trough moves into its switch actuating position, it will be appreciated that a greater quantity of feed must be placed on the trough to return the same to its neutral position than is necessary to maintain the same balanced. Consequently the motor need only operate at intervals to maintain the trough sufficiently full, even though poultry may be consuming from the trough at a constant rate.

It is to be also noted at this time that the hopper is disposed above the trough and that the converging side walls thereof permit only the heads of the poultry to get into the trough, whereby the poultry cannot throw the feed out of the trough or impair operation of the automatic dispensing mechanism and actuator therefor.

Having described the invention, what is claimed as new is:

1. An automatic feeder comprising a support, a hopper mounted in elevated relation on said support, said hopper having relatively converging side walls terminating in spaced relation, a longitudinally fluted cylinder disposed in closing relation with said converging side walls, a trough placed in spaced relation below said cylinder, said trough being pivotally mounted adjacent one end thereof for oscillatory movement toward and away from said cylinder, a counterweight attached to said trough, said counterweight being sufficient to cause movement of an empty trough toward said cylinder, means including a motor for rotating said cylinder, a switch responsive to movement of said trough toward said cylinder for energizing said motor.

2. An automatic feeder comprising a support, a hopper mounted in elevated relation on said support, said hopper having converging sides defining a discharge slot, a fluted dispensing roller mounted in said slot, a motor connected in driving relation to said roller, a trough mounted in spaced relation below said slot, said trough being pivoted adjacent one end for movement toward and away from said slot, a counterweight operatively connected to said trough, said counterweight including an elongated container, a fluid weight in said container, said container being so positioned that when said trough is moved away from said slot the center of gravity of said weight moves closer to said trough, and when said trough moves toward said slot the center of gravity of said weight moves away from said trough, a switch, said counterweight being operatively connected to said switch to energize said motor in response to movement of said trough toward said slot.

3. In an automatic feeder having a hopper with a discharge slot and a fluted dispensing roller mounted in said slot, a feed trough mounted in spaced relation below said slot, said trough being pivoted adjacent one end for movement toward and away from said slot, a counterbalance fixed to said trough, said counterbalance including an elongated container, a fluid weight in said container, said container being so positioned that when said trough is moved away from said slot the fluid weight will have a short lever arm with respect to said trough, and when said trough is moved toward said slot the fluid weight will have a long lever arm with respect to said trough.

4. In an automatic feeder having a hopper with a discharge slot and a fluted dispensing roller mounted in said slot, a feed trough mounted in spaced relation below said slot, said trough being pivoted adjacent one end for movement toward and away from said slot, a counterbalance fixed to said trough, said counterbalance including an elongated container, a fluid weight in said container, said container being so positioned that when said trough is moved away from said slot the fluid weight will have a short lever arm with respect to said trough, and when said trough is moved toward said slot the fluid weight will have a long lever arm with respect to said trough, a motor connected in driving relation to said dispensing roller, a switch responsive to the position of said trough for energizing said motor when said trough is moved toward said slot.

HARRY ERICKSON.

References Cited in the file of this patent

UNITED STATES PATENTS

| Number | Name | Date |
|---|---|---|
| 21,645 | Allington | Oct. 5, 1858 |
| 434,723 | Richards | Aug. 19, 1890 |
| 772,121 | Anderson | Oct. 11, 1904 |
| 1,203,286 | Webber | Oct. 31, 1916 |
| 1,358,525 | Cottrel | Nov. 9, 1920 |
| 1,449,485 | Alspach | Mar. 27, 1923 |
| 1,587,775 | Higgins | June 8, 1926 |
| 2,011,608 | Belknap | Aug. 20, 1935 |
| 2,101,561 | Rapp | Dec. 7, 1937 |
| 2,123,318 | Taylor | July 12, 1938 |
| 2,285,765 | Carswell | June 9, 1942 |
| 2,563,894 | White | Aug. 14, 1951 |

FOREIGN PATENTS

| Number | Country | Date |
|---|---|---|
| 134,111 | Germany | Sept. 20, 1902 |